United States Patent [19]

Beaver

[11] Patent Number: 5,022,549

[45] Date of Patent: Jun. 11, 1991

[54] COLLAPSIBLE BEVERAGE COOLER HOLDER

[76] Inventor: Commodore E. Beaver, 211 Frank St., Council Bluffs, Iowa 51503

[21] Appl. No.: 564,640

[22] Filed: Aug. 9, 1990

[51] Int. Cl.[5] .................................................. B65D 25/28
[52] U.S. Cl. ................................. 220/85 H; 248/146; 220/484; 220/487
[58] Field of Search ............. 220/85 H, 484; 248/146; 206/486, 487, 488, 490

[56] References Cited

U.S. PATENT DOCUMENTS

| 4,026,435 | 5/1977 | Hendon | 220/85 H |
| 4,163,374 | 8/1979 | Moore et al. | 220/85 H |
| 4,305,533 | 12/1981 | Wightman et al. | 220/85 H |
| 4,726,553 | 2/1988 | Wischusen III | 220/85 H |
| 4,746,028 | 5/1988 | Bagg | 220/85 H |
| 4,852,842 | 8/1989 | Chandler | 220/85 H |

Primary Examiner—Joseph Man-Fu Moy

[57] ABSTRACT

A collapsible thermoplastic holder for supporting a beverage can insulation jacket cooler containing a beverage can being supported, the holder having a cooler receiver having a chamber with a lower anchor-receiving opening. An anchor telescopes in the receiver and is insertable into a beverage can support hole in a golf cart, boat, or other large unit for giving support to the receiver. The anchor can be removed and placed in the cooler. The cooler can then be placed in the receiver for compact storage of both holder and cooler in a golf bag, for example.

5 Claims, 1 Drawing Sheet

COLLAPSIBLE BEVERAGE COOLER HOLDER

FIELD OF THE INVENTION

This invention is in the field of supports for beverage cans.

BACKGROUND

Beverage can support holes in golf carts, boats, and recreational vehicles have been of the size to receive the lower end of a common beverage can.

But beverage cans become luke-warm quick in the hot sun on a hot golf course or in an open boat in the sun on a lake. A person in such activities is hot also and wants a cool beverage not a luke-warm one.

There have long been insulation jackets of styrofoam, called coolers. These coolers keep a beverage cool very well but they will not fit into the can-sized holes on golf carts, boats and recreational vehicles where tipping over of an insulated beverage can is likely, with loss of the desired cool beverage.

Patents on can insulation devices have been known since before issuance on Jan. 1, 1980 of U.S. Pat. No. 4,181,765 to Richard C. Harmony, and titled: Insulator For Canned Drinks.

So the thirsty public has long been without a support system for insulation-jacketed beverage cans.

A problem of storage in a golf bag would arise for an insulation-jacket equipped with a fixed extension to fit into a support hole. This invention solves the problem with an inner extension removable from the outer jacket-receiver hereof and, after reversal, insertable into the jacket. The jacket, or cooler, can then be placed into the jacket receiver and all three parts are then of a minimum total nested size for fitting into a golf bag crowded with golf balls, gloves, sun tan cream, rain gear, towels and many other items.

Figures 1, 2:
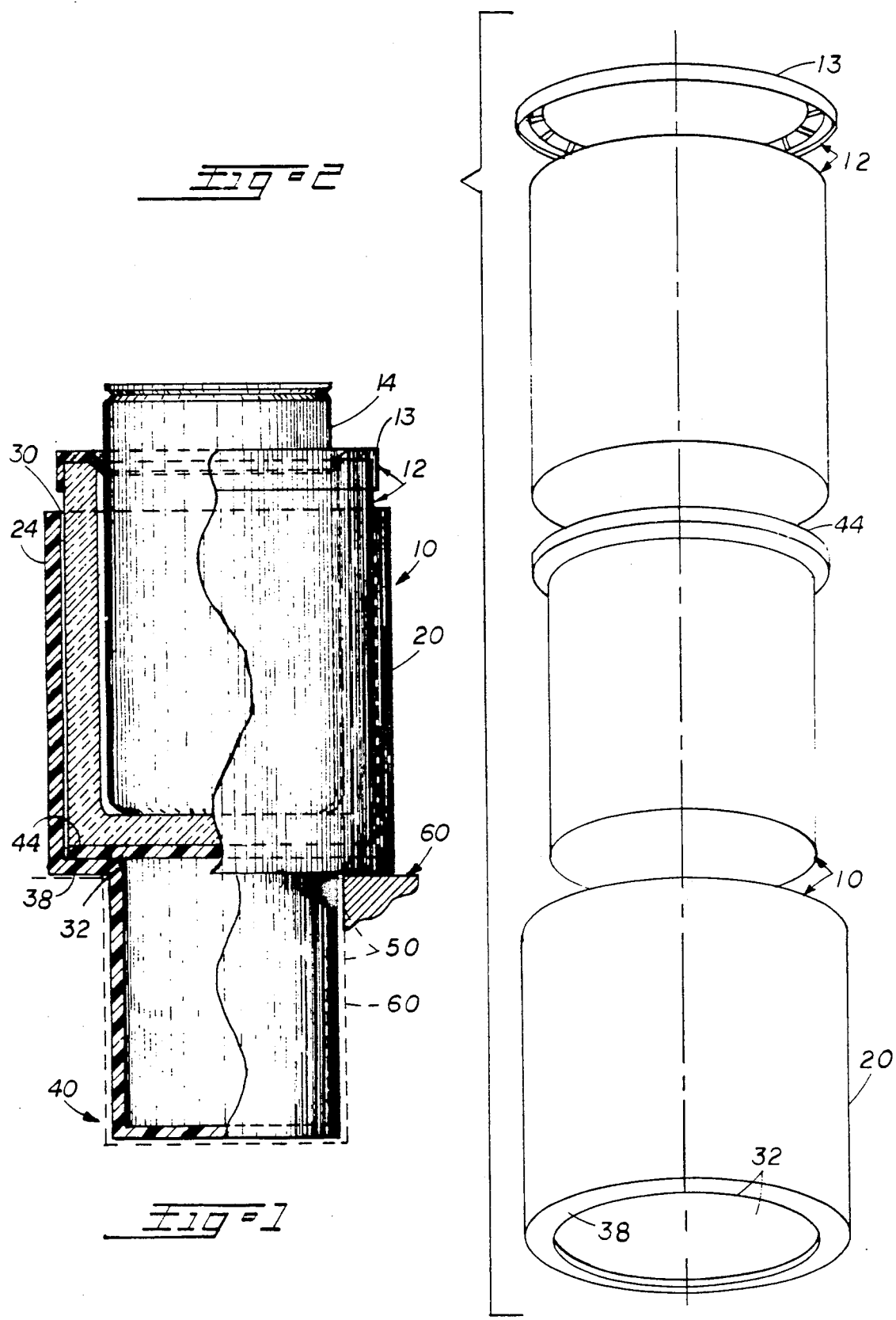
FIG. 1 is a frontal elevation of the collapsible beverage can holder hereof shown with its anchor lowered and inserted into a can supporting recess in a golf cart, the latter mostly broken away and partly shown in dotted lines. A can is shown in the can holder. Parts of the forward left section of the holder are broken away.
FIG. 2 is an exploded perspective view of the can holder without the can inside.

The view is as seen from the front looking upwardly. The anchor in FIG. 2 and the cooler are not yet inserted into the receiver, and a sealer is not on the cooler.

This view is only diagrammatic, and so is not shaded.

DESCRIPTION OF THE PREFERRED EMBODIMENT

In FIG. 1 a collapsible beverage can and insulator holder 10 is shown and is useful for holding an insulation jacket 12 receiving a beverage container 14.

The beverage container can and insulator holder 14 has a jacket receiver 20 having an upstanding annular side wall 24 substantially surrounding a jacket-receiving upwardly opening chamber 30.

The jacket receiver 20 has at its bottom an anchor-receiving opening 32 extending vertically therethrough into the chamber 30. A retaining flange 38 extends inwardly from the side wall 24.

An anchor 40 has a lower portion slidably extending through the anchor-receiving opening 32. The anchor 40 has an upper portion provided with a catch 44 protruding horizontally therefrom and slidable in and even out of the chamber 30. The catch 44 is above and adapted to engage the upper side of the retaining flange 38 to retain the anchor 40 from passing downwardly out of the receiver 20 whereby when the anchor 40 is held from tipping over by insertion into an upwardly opening recess 50 in a large object 60, then the engagement of the catch 44 with the retaining flange 38 will keep the receiver 20 from tipping over. Thus, support is given to the jacket 12 and to a beverage container 14 therein.

The beverage container can be a beverage can of the most common size. The large object 60 can be a golf cart, a boat or recreational vehicle or even a chair or table.

In operation, storage is accomplished when (a) the jacket 12 has been emptied of its beverage container, and (b) the jacket 12 has been removed from the chamber 30, and (c) the anchor has been removed out of the receiver 20 (d) the jacket has been replaced in the chamber, and (e) the bottom end of the anchor 40 is nested into the jakcet 12 for compact storage of the jacket and the holder.

The holder can be of a size such that the anchor 40 is approximately 2¾" in maximum horizontal dimension to in common recesses 50. The lower portion 42 of the anchor is preferably cylindrical like a beverage can. The receiver 20 and the anchor 40 are each made of one piece of thermoplastic material for economy.

I claim:

1. A collapsible beverage can and insulator holder, for holding an insulation jacket containing a beverage container comprising: a jacket receiver having a jacket-receiving upwardly opening chamber, said jacket having an upstanding side wall means on at least a plurality of sides of said chamber and capable of retaining a cylindrical cooler from falling over to one side, said receiver having at its bottom an anchor-receiving opening extending vertically therethrough and opening into said chamber, a retaining flange means inwardly extending from said jacket side wall means, an anchor having a lower portion slidably extending through said anchor-receiving opening, said anchor having an upper portion having a catch protruding horizontally therefrom, said anchor being slidable in said chamber, said catch being above and adapted to engage said retaining flange means to retain said anchor from passing downwardly out of said receiver whereby when said anchor is held from tipping over by insertion into an upwardly opening recess in a large object then the engagement of said catch with said retainer will keep said receiver from tipping over whereby support is given to said jacket and to a beverage container therein.

2. The holder of claim 1 having an insulation jacket slidably received in said receiver whereby when (a) said jacket has been emptied of a beverage container and (b) said insulation jacket has been removed from said chamber and (c) said anchor has been removed out of said receiver, and (d) said jacket has been replaced in said chamber, then (e) the bottom end of said anchor can be nested into said jacket for compact storage of said jacket and said holder.

3. The holder of claim 1 having the lower portion of said anchor being approximately 2¾ inches in maximum horizontal dimension.

4. The holder of claim 1 having said lower portion of said anchor being cylindrical.

5. The holder of claim 1 having said receiver and said anchor both being made of thermoplastic material.

* * * * *